United States Patent
Schlichting (10) Patent No.: US 10,808,930 B2
(45) Date of Patent: Oct. 20, 2020

(54) COMBUSTOR SHELL ATTACHMENT

(71) Applicant: UNITED TECHNOLOGIES CORPORATION, Farmington, CT (US)

(72) Inventor: Kevin W. Schlichting, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 239 days.

(21) Appl. No.: 16/022,080

(22) Filed: Jun. 28, 2018

(65) Prior Publication Data

US 2020/0003417 A1    Jan. 2, 2020

(51) Int. Cl.
| | | |
|---|---|---|
| F23R 3/60 | (2006.01) | |
| F23R 3/00 | (2006.01) | |
| F02C 3/14 | (2006.01) | |
| F16B 5/02 | (2006.01) | |
| F02K 3/06 | (2006.01) | |

(52) U.S. Cl.
CPC ............... *F23R 3/002* (2013.01); *F02C 3/14* (2013.01); *F16B 5/0208* (2013.01); *F23R 3/60* (2013.01); *F02K 3/06* (2013.01); *F05D 2220/32* (2013.01); *F05D 2230/60* (2013.01); *F05D 2240/35* (2013.01); *F05D 2260/30* (2013.01); *F23R 2900/00017* (2013.01)

(58) Field of Classification Search
CPC .......... F23R 3/002; F23R 3/60; F16B 5/0208; F05D 2260/30; F05D 2260/31; F02C 7/20
See application file for complete search history.

(56) References Cited

U.S. PATENT DOCUMENTS

| | | | | |
|---|---|---|---|---|
| 3,545,202 A | * | 12/1970 | Batt | ........................... F23R 3/06 60/757 |
| 4,805,397 A | * | 2/1989 | Barbier | ..................... F23R 3/06 60/800 |
| 4,944,151 A | | 7/1990 | Hovnanian | |
| 5,369,952 A | | 12/1994 | Walters | |
| 5,415,000 A | * | 5/1995 | Mumford | .................. F23R 3/60 60/747 |
| 6,619,915 B1 | | 9/2003 | Jorgensen | |
| 8,800,298 B2 | | 8/2014 | Ladd et al. | |
| 9,010,123 B2 | * | 4/2015 | Rudrapatna | ............... F23R 3/06 60/754 |

(Continued)

FOREIGN PATENT DOCUMENTS

| | | |
|---|---|---|
| EP | 2738470 | 6/2014 |
| EP | 2743585 | 6/2014 |

OTHER PUBLICATIONS

European Patent Office, European Search Report dated Nov. 12, 2019 in Application No. 19183202.1.

*Primary Examiner* — Steven M Sutherland
(74) *Attorney, Agent, or Firm* — Snell & Wilmer L.L.P.

(57) ABSTRACT

A combustor shell is provided. The combustor shell may include a first aperture at least partially defined by an inner wall of the combustor shell and passing from a diffuser-facing side of the combustor shell to a combustor-facing side of the combustor shell. The combustor shell may include a spacer comprising a first segment coupled to a first flange, wherein the first flange is disposed on the diffuser-facing side of the combustor shell, wherein an outer wall of the spacer is coupled with at least a portion of an inner wall of the combustor shell.

12 Claims, 8 Drawing Sheets

(56) References Cited

U.S. PATENT DOCUMENTS

| | | | |
|---|---|---|---|
| 9,518,737 B2 | 12/2016 | Pidcock et al. | |
| 2011/0011095 A1* | 1/2011 | Ladd | F23R 3/60 |
| | | | 60/796 |
| 2014/0144146 A1* | 5/2014 | Penz | F23R 3/007 |
| | | | 60/753 |
| 2015/0369269 A1* | 12/2015 | Holt | F16B 21/02 |
| | | | 411/108 |
| 2017/0167730 A1 | 6/2017 | Heinze et al. | |

* cited by examiner

COMBUSTOR SHELL ATTACHMENT

FIELD

The present disclosure relates generally to combustors, and more specifically to combustor shell attachment features.

BACKGROUND

A gas turbine engine typically includes a fan section, a compressor section, a combustor section, and a turbine section. Combustors used in gas turbine engines generally rely on combustor panels, attached to a combustor shell, to interface with hot combustion gases and guide the combustion gases into the turbine. Combustor panels attachment features extend through oblong holes in the combustor shell. Combustor panels may buckle and crack in operation if they are not able to thermally expand at increased temperatures.

SUMMARY

According to various embodiments, a combustor shell is described herein. The combustor shell may include a first aperture at least partially defined by an inner wall of the combustor shell and passing from a diffuser-facing side of the combustor shell to a combustor-facing side of the combustor shell. The combustor shell may include a spacer comprising a first segment coupled to a first flange, wherein the first flange may be disposed on the diffuser-facing side of the combustor shell, wherein an outer wall of the spacer may be coupled with at least a portion of an inner wall of the combustor shell. In various embodiments, the first aperture of the combustor shell may be an oblong shape. In various embodiments, the spacer may include threads on an inner wall of the spacer. In various embodiments, the spacer may be press fit into the combustor shell. In various embodiments, the spacer may be configured to engage an attachment feature of a combustor panel. In various embodiments, a contact length between the spacer and the attachment feature may be greater than a distance between the diffuser facing side of the combustor shell and the combustor facing side of the combustor shell. In various embodiments, the spacer may include a second flange coupled with the first segment and disposed on the combustor-facing side of the combustor shell. In various embodiments, the spacer may include a spacer aperture at least partially defined by an inner wall of the spacer.

According to various embodiments, a gas turbine engine is described herein. The gas turbine engine may include a combustor shell. The combustor shell may include a first aperture at least partially defined by an inner wall of the combustor shell and passing from a diffuser-facing side of the combustor shell to a combustor-facing side of the combustor shell. The combustor shell may include a spacer comprising a first segment coupled to a first flange, wherein the first flange may be disposed on the diffuser-facing side of the combustor shell, wherein an outer wall of the spacer may be coupled with at least a portion of an inner wall of the combustor shell. In various embodiments, the first aperture of the combustor shell may be an oblong shape. In various embodiments, the spacer may include threads on an inner wall of the spacer. In various embodiments, the spacer may be press fit into the combustor shell. In various embodiments, the spacer may be configured to engage an attachment feature of a combustor panel. In various embodiments, a contact length between the spacer and the attachment feature may be greater than a distance between the diffuser facing side of the combustor shell and the combustor facing side of the combustor shell. In various embodiments, the spacer may include a second flange coupled with the first segment and disposed on the combustor-facing side of the combustor shell. In various embodiments, the spacer may include a spacer aperture at least partially defined by an inner wall of the spacer.

According to various embodiments, method of mounting a combustor panel to a combustor shell is described herein. The method may include inserting a spacer into a combustor shell, the spacer comprising a spacer aperture at least partially defined by an inner wall of the spacer. The method may include engaging an attachment feature of the combustor panel through the spacer aperture. The method may include engaging a nut on the attachment feature. In various embodiments, the method may include machining a first aperture into the combustor shell. In various embodiments, the method may include torquing the nut. In various embodiments, the inserting the spacer into the combustor shell comprises press fitting the spacer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Figure 1:
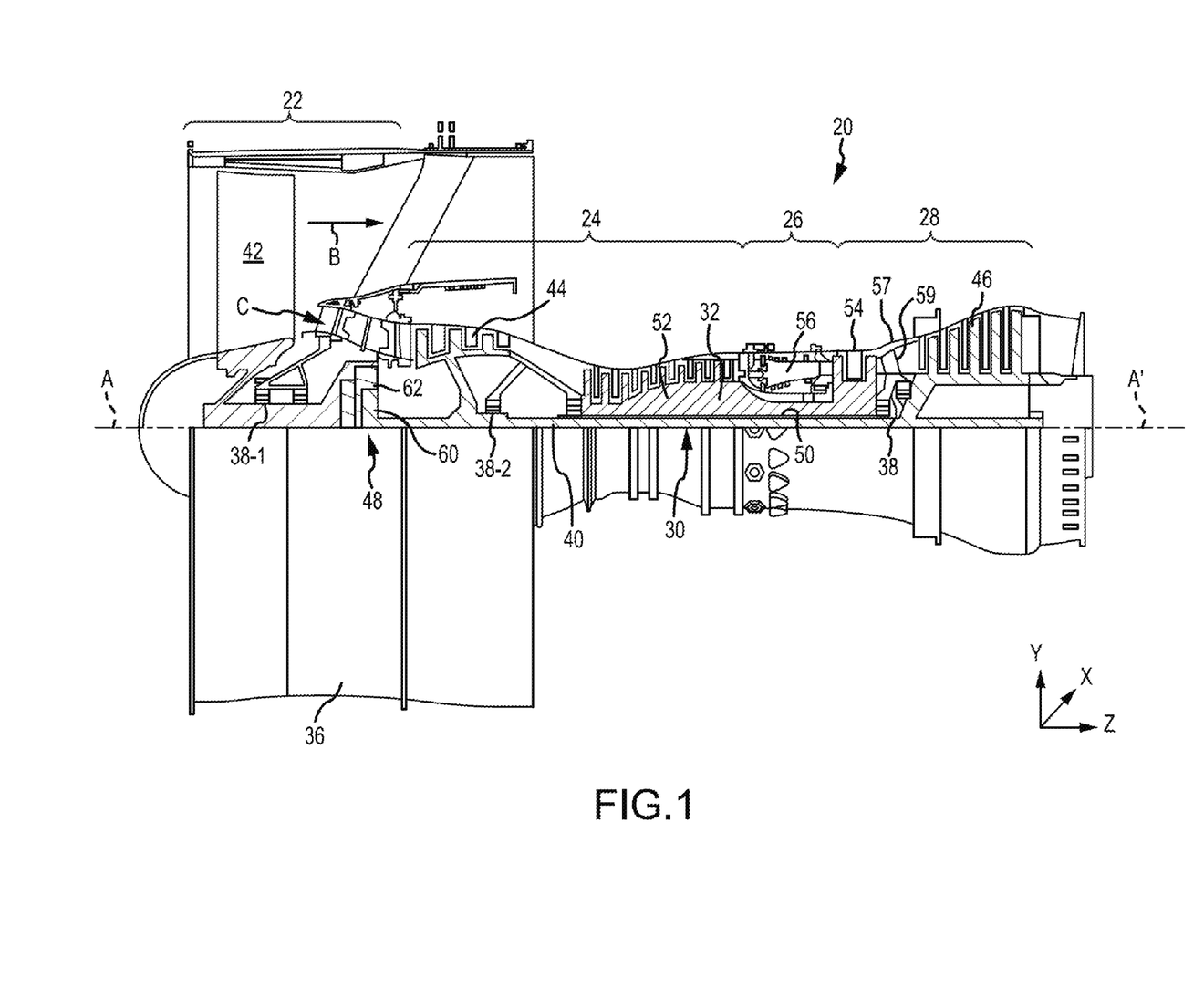
FIG. 1 is a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having combustor outer shell 104 and a combustor inner shell 184 that support respective inner and outer heat shielding liners. Combustor outer shell 104 and combustor inner shell 184 may be hereafter referred to together as combustor shell 104, 184. The heat shield liners may include a plurality of combustor panels that collectively define the annular combustion chamber of the combustor 56. An annular cooling cavity is defined between the combustor shell 104, 184 and combustor panels for supplying cooling air. Impingement holes are located in the combustor shell 104, 184 to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
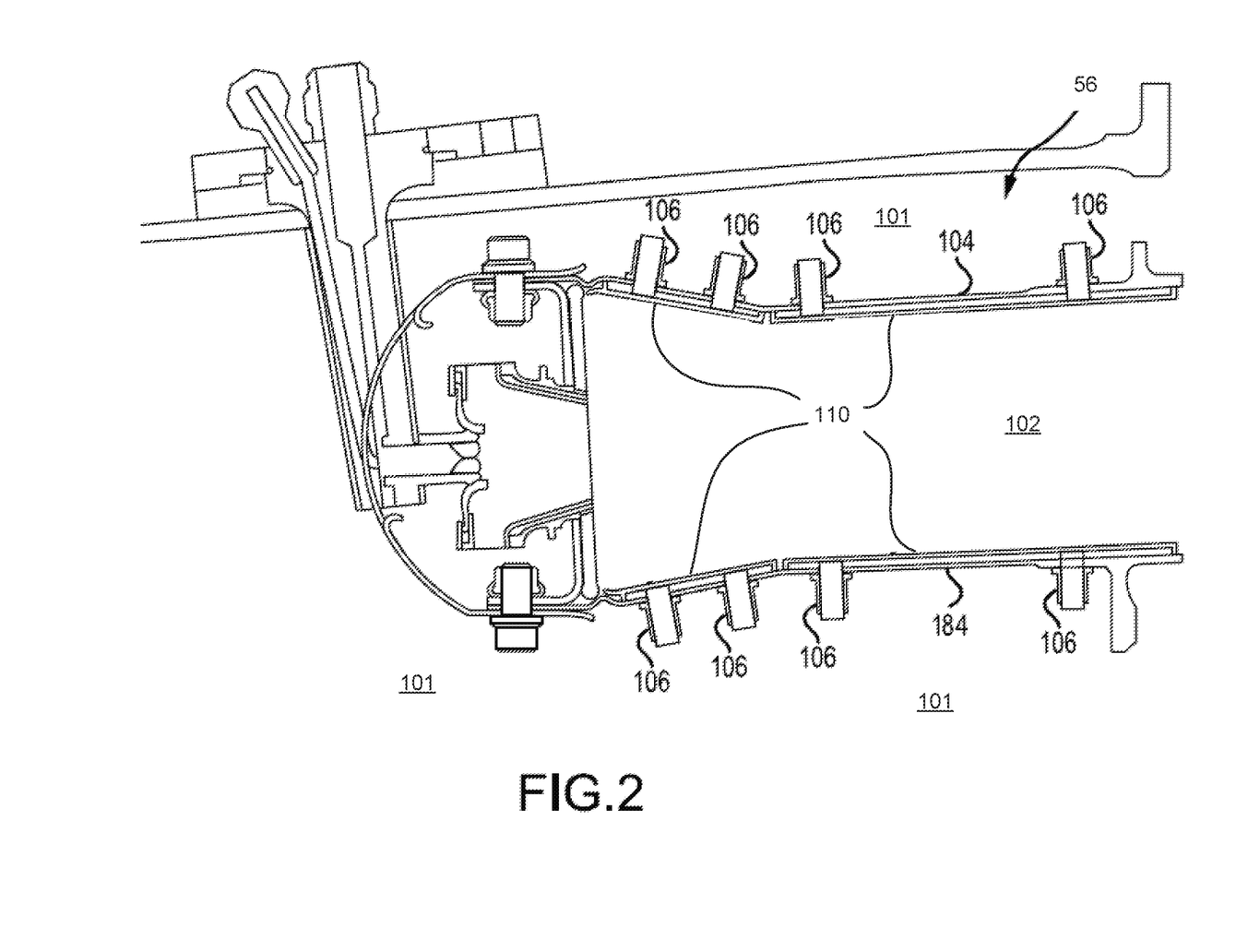
FIG. 2 is a cross-sectional view of a combustor of a gas turbine engine, in accordance with various embodiments.

With reference to FIG. 2, an in accordance with various embodiments, one or more combustor panels 110 (e.g., thermal shields, combustor liners) may be positioned in combustor 56 to protect various features of the combustor 56 from the high temperature flames and/or combustion gases. The combustor 56, in various embodiments, may have a combustor chamber 102 defined by a combustor outer shell 104 and a combustor inner shell 184. Combustor outer shell 104 and combustor inner shell 184 may be hereafter referred to together as combustor shell 104, 184. A diffuser chamber 101 is external the combustor 56 and cooling air may be configured to flow through the diffuser chamber 101 around the combustor 56. The combustor chamber 102 may form a region of mixing of core airflow C (with brief reference to FIG. 1) and fuel, and may direct the high-speed exhaust gases produced by the ignition of this mixture inside the combustor 56. Combustor shell 104, 184 may provide structural support to the combustor 56 and its components. For example combustor shell 104, 184 may comprise a substantially cylindrical or a substantially conical canister portion defining an inner area comprising the combustor chamber 102.

As mentioned above, it may be desirable to protect combustor shell 104, 184 from the harmful effects of high temperatures. Accordingly, one or more combustor panels 110 may be disposed inside the combustor chamber 102 and may provide such protection. The combustor panels 110 may comprise a partial cylindrical or conical surface section. An outer combustor thermal panel may be arranged radially inward of the combustor outer shell 104, for example, circumferentially about the inner surface of the combustor outer shell 104 and one or more inner combustor panels may also be arranged radially outward of the combustor inner shell 184. Thus, while the terms "radially outward" and "radially inward" are defined above as being relative to the engine central longitudinal axis A-A', the terms "outward" and "inward," without the modifier "radially," refer to positions relative to the combustor chamber 102. That is, combustor shell 104, 184 may be outward of the combustor panel 110, and vice versa. The combustor panels 110 may comprise a variety of materials, such as metal, metal alloys, and/or ceramic matrix composites, among others.

With continued reference to FIG. 2, the combustor panels 110 may be mounted and/or coupled to the combustor shell 104, 184 via one or more attachment features 106. The combustor panels 110 may be made of any suitable heat tolerant material. In this manner, the combustor panels 110 may be substantially resistant to thermal mechanical fatigue in order to inhibit cracking of the combustor panels 110 and/or to inhibit liberation of portions of the combustor panels 110. In various embodiments, the combustor panels 110 may be made from a nickel based alloy and/or a cobalt based alloy, among others. For example, the combustor panels 110 may be made from a high performance nickel-based super alloy. In various embodiments, the combustor panels 110 may be made from a cobalt-nickel-chromium-tungsten alloy.

Figure 3A:
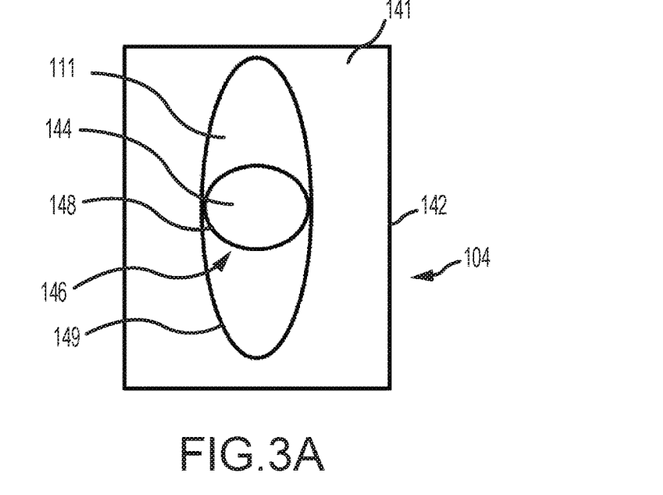
FIG. 3A is a view of a combustor shell, in accordance with various embodiments.
Figure 3B:
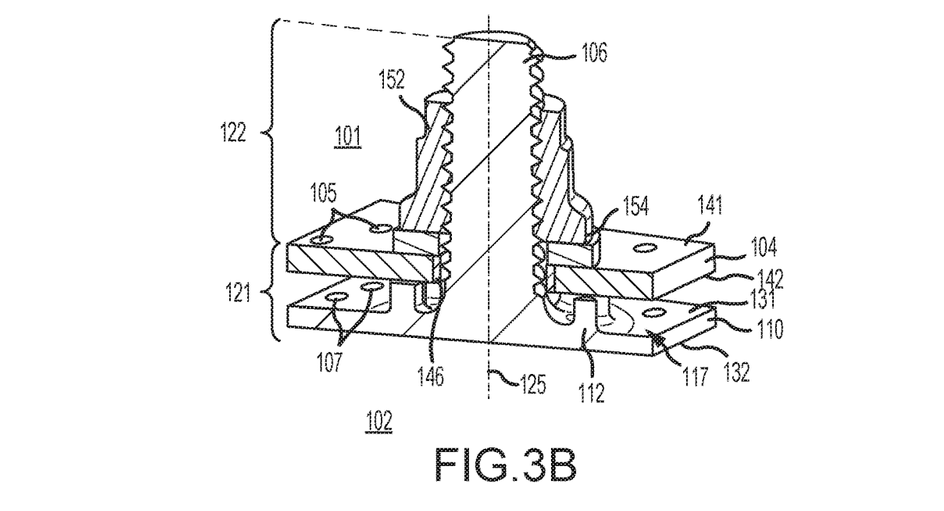
FIG. 3B is a perspective cross-sectional view of an attachment feature of a combustor panel extending through a combustor shell, in accordance with various embodiments.
Figure 3C:
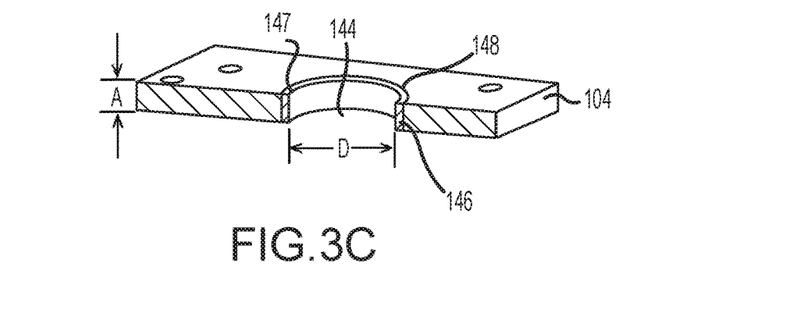
FIG. 3C is a cross-sectional view of a combustor shell, in accordance with various embodiments.

In various embodiments, and with reference to FIGS. 3A-3C, combustor shell 104, 184 may comprise a diffuser-facing side 141 and a combustor-facing side 142. Combustor shell 104, 184 may comprise first aperture 111 at least partially defined by the combustor shell 104, 184 and passing from diffuser-facing side 141 to combustor-facing side 142 of the combustor shell 104, 184. First aperture 111 may be at least partially bound by inner wall 149 of combustor shell 104, 184. First aperture 111 may be oval, obround, or another elongated shape (e.g., a slot) to provide clearance/tolerance during assembly/installation of the combustor panel 110. Combustor shell 104, 184 may comprise a plurality of first aperture 111.

Combustor shell 104, 184 may comprise spacer 146. Spacer 146 may extend between diffuser-facing side 141 and combustor facing side 142 of combustor shell 104, 184. Spacer 146 may comprise spacer aperture 144 at least partially defined by inner wall 147 of spacer 146. Spacer aperture 144 may pass from diffuser-facing side 141 to combustor-facing side 142 of the combustor shell 104, 184.

Outer wall 148 of spacer 146 may contact at least a portion of inner wall 149 of combustor shell 104, 184. The contact between outer wall 148 and inner wall 149 of combustor shell 104, 184 may reduce the friction force between the combustor shell 104 and the attachment feature 106. The tolerance fit between spacer 146 and combustor shell 104, 184 may set the friction force pre-load. At operating temperature, the friction force between the spacer 146 and combustor shell 104, 184 may be constant due the thermal expansion at the spacer 146.

In various embodiments, spacer 146 may be configured to receive attachment feature 106. Attachment feature 106 may extend through spacer aperture 144 of spacer 146. Spacer 146 may allow an application of torque on attachment feature 106 to keep the combustor panel 110 from becoming loose from the combustor shell 104, 184. Attachment features 106 may facilitate coupling and/or mounting the combustor panels 110 to the combustor shell 104, 184 of the combustor 56. In various embodiments, attachment feature 106 may be a boss or a stud extending from the combustor panels 110. For example, the attachment feature 106 may be a cylindrical boss, such as a pin with a threaded circumference, or may be a rectangular boss, such as for receiving a clip, or may be any other apparatus whereby the combustor panel 110 is mounted to the combustor shell 104, 184.

The attachment feature 106 may be integrally formed with the combustor panel 110. The attachment feature 106, according to various embodiments and with reference to FIG. 3B, has a central longitudinal axis 125 and extends from the cold side 131 of the combustor panel 110. The attachment feature 106 may include a base portion 121 and a tip portion 122. The base portion 121 of the attachment feature 106 is generally defined, according to various embodiments, as the section of the attachment feature 106 disposed between the cold side 131 of the combustor panel 110 and the diffuser-facing side 141 of the combustor shell 104, 184. The tip portion 122 of the attachment feature 106 is generally defined, according to various embodiments, as the section of the attachment feature 106 disposed outward of the diffuser-facing side 141 of the combustor shell 104, 184. Once again, as established above, the terms "outward" and "inward," without the modifier "radially", refer to positions relative to the combustor chamber 102. That is, the combustor shell 104, 184 is outward of the combustor panel 110.

In various embodiments, the attachment feature 106 comprises a threaded stud that extends through spacer aperture 144 in the combustor shell 104, 184. The attachment feature 106 may be retained in position by a nut 152 disposed outward of the combustor shell 104, 184 and engaged onto the attachment feature and torqued so that the attachment feature 106 is preloaded with a retaining force and securely affixes the combustor panel 110 in a substantially fixed position relative to the combustor shell 104, 184. In various embodiments, and with continued reference to FIG. 3B, the combustor panel 110 includes a plurality of standoffs 112 extending from the cold side 131 of the combustor panel 110 that are circumferentially distributed around the base portion 121 of the attachment feature 106. In various embodiments, the standoffs 112 sustain a distance between the combustor panel 110 and the combustor shell 104, 184 and prevent the combustor attachment feature 106 from being overloaded with a retaining force that would drive the combustor panel 110 and the combustor shell 104, 184 too close together. In various embodiments, a washer 154 may be disposed between the nut 152 and the diffuser-facing side 141 of the combustor shell 104, 184.

In various embodiments, an annular cooling cavity 117 is formed and/or defined between the combustor shell 104, 184 and the combustor panel 110. As mentioned above, cooling air in the diffuser chamber 101 may enter the annular cooling cavity 117 via impingement holes 105 formed in the combustor shell 104, 184. That is, impingement holes 105 may extend from a diffuser-facing side 141 of the combustor shell 104, 184 to a combustor-facing side 142 of the combustor shell 104, 184 and may supply cooling air to the annular cooling cavity 117. The cooling air in the annular cooling cavity 117 may enter the combustor chamber 102 via effusion holes 107 formed in the combustor panel. That is, effusion holes 107 may extend from a cooling surface or "cold side" 131 of the combustor panel to a combustion facing surface or "hot side" 132 of the combustor panel that is opposite the cold side 131. In various embodiments, the effusion holes 107 are generally oriented to create a protective "blanket" of air film over the hot side 132 of the combustor panel thereby protecting the combustor panel from the hot combustion gases in the combustor chamber 102.

In various embodiments and with reference to FIG. 3C, engagement length A is the length of contact between attachment feature 106 and inner wall 147 of spacer 146. Spacer 146 may also have diameter D. In various embodiments, spacer 146 and attachment feature 106 may be made from metallic materials selected to exhibit favorable wear characteristics. For example, spacer 146 may be made from a cobalt-chromium alloy having favorable wear characteristics (e.g., one of the alloys available under the trademark STELLITE). Spacer 146 may be made, for example, by the machining process known as turning. Spacer 146 may comprise a bushing. In various embodiments, spacer 146 may be integrally formed with combustor shell 104, 184. Spacer 146 may be press fit into combustor shell 104, 184.

Figure 4A:
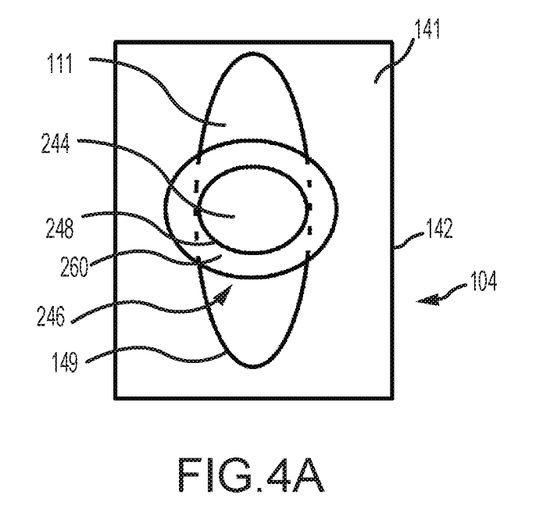
FIG. 4A is a view of a combustor shell, in accordance with various embodiments.
Figure 4B:
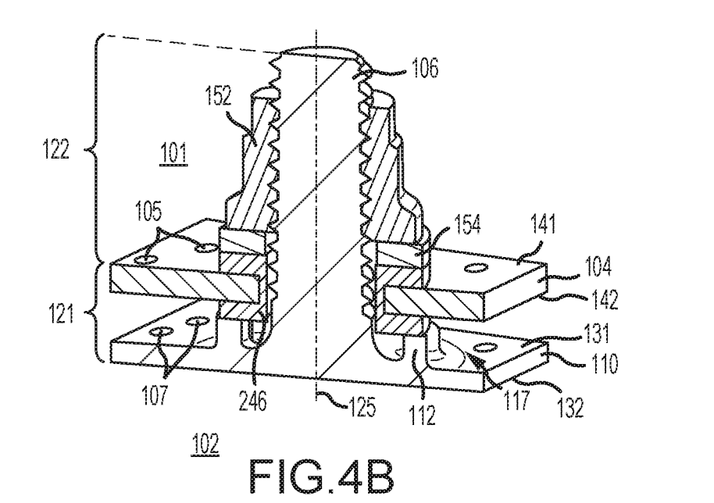
FIG. 4B is a perspective cross-sectional view of an attachment feature of a combustor panel extending through a combustor shell, in accordance with various embodiments.
Figure 4C:
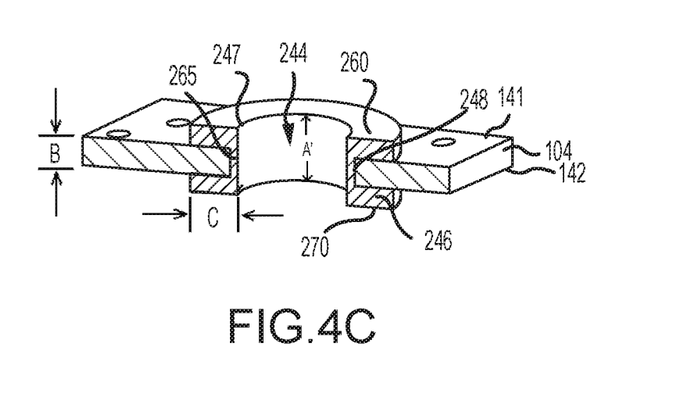
FIG. 4C is a cross-sectional view of a combustor shell, in accordance with various embodiments.

In various embodiments, and with reference to FIGS. 4A-4C, combustor shell 104, 184 may comprise spacer 246. Spacer 246 may extend between diffuser-facing side 141 and combustor facing side 142 of combustor shell 104, 184. Spacer 246 may comprise spacer aperture 244 at least partially defined by inner wall 247 of spacer 246. Spacer aperture 244 may pass from diffuser-facing side 141 to combustor-facing side 142 of the combustor shell 104, 184. Outer wall 248 of spacer 246 may contact at least a portion of inner wall 149 of combustor shell 104, 184.

In various embodiments, spacer 246 may comprise first flange 260. First flange 260 may be disposed on and along the diffuser-facing 141 side of the combustor shell 104, 184. Spacer 246 may comprise first segment 265 disposed between inner wall 247 and outer wall 248. In various embodiments, spacer 246 may comprise second flange 270. Second flange 270 may be disposed on and along the combustor-facing 142 side of the combustor shell 104, 184. First segment 265 may be disposed between the first flange 260 and second flange 270. Engagement length A' is the length of contact between attachment feature 106 and inner wall 247 of spacer 246. Length B is the length between diffuser-facing side 141 and combustor facing side 142 of combustor shell 104, 184. Length B may correspond to the length of the first segment 265. Spacer 246 may also have width C wherein spacer 246 extends radially outward of outer wall 248 along diffuser-facing side 141 and combustor facing side 142 of combustor shell 104, 184. Width C may correspond to the width of one or both first flange 260 and second flange 270. In various embodiments, length A' may be greater than length B.

In various embodiments, a washer 154 may be disposed between the nut 152 and first flange 260 of spacer 246. In various embodiments, the standoffs 112 may contact second flange 270 of spacer 246. Spacer 246 may comprise a bushing.

Figure 5A:
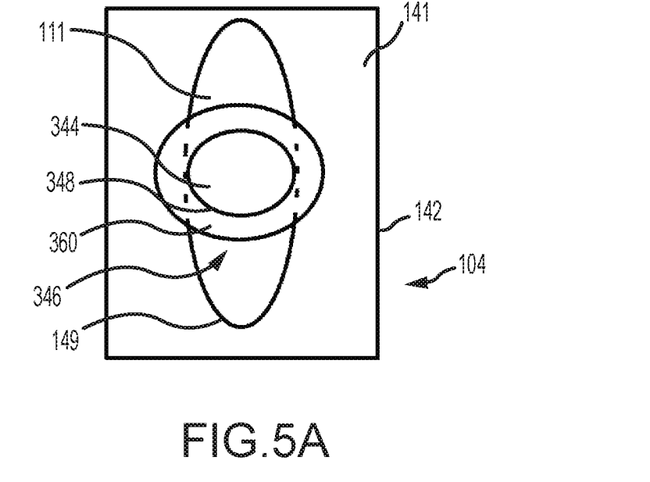
FIG. 5A is a view of a combustor shell, in accordance with various embodiments.
Figure 5B:
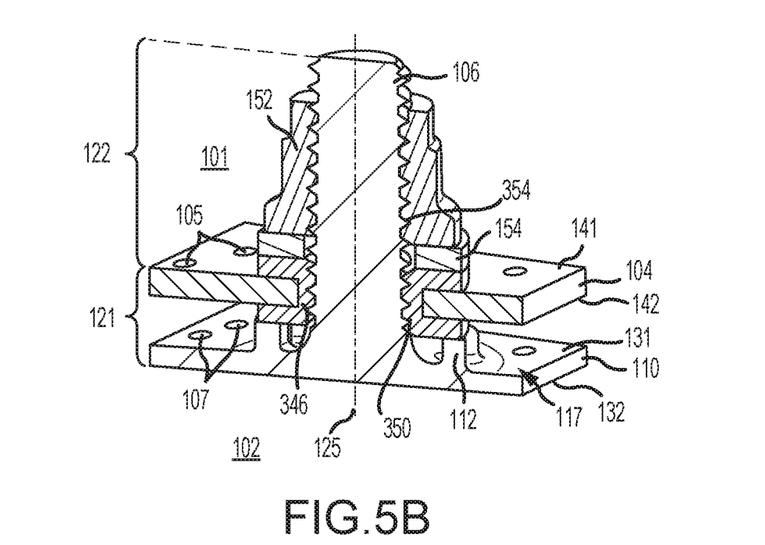
FIG. 5B is a perspective cross-sectional view of an attachment feature of a combustor panel extending through a combustor shell, in accordance with various embodiments.
Figure 5C:
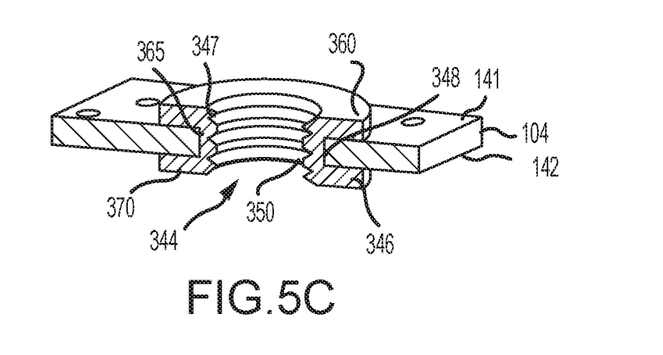
FIG. 5C is a cross-sectional view of a combustor shell, in accordance with various embodiments.

With reference to FIG. 5A-5C, combustor shell 104, 184 may comprise spacer 346. Spacer 346 may extend between diffuser-facing side 141 and combustor facing side 142 of combustor shell 104, 184. Spacer 346 may comprise spacer aperture 344 at least partially defined by inner wall 347 of spacer 346. Spacer aperture 344 may pass from diffuser-facing side 141 to combustor-facing side 142 of the combustor shell 104, 184. Outer wall 348 of spacer 346 may contact at least a portion of inner wall 149 of combustor shell 104, 184.

In various embodiments, spacer 346 may comprise first flange 360. First flange 360 may be disposed on and along the diffuser-facing 141 side of the combustor shell 104, 184. Spacer 346 may comprise first segment 365 disposed between inner wall 347 and outer wall 348. In various embodiments, spacer 346 may comprise second flange 370. Second flange 370 may be disposed on and along the combustor-facing 142 side of the combustor shell 104, 184. First segment 365 may be disposed between the first flange 360 and second flange 370. Spacer 346 may comprise threads 350 on an inner wall 347 which may mate with threads 354 along attachment feature 106.

In various embodiments, a washer 154 may be disposed between the nut 152 and first flange 360 of spacer 346. In various embodiments, the standoffs 112 may contact second flange 370 of spacer 346. Spacer 346 may comprise a bushing.

Figure 6:
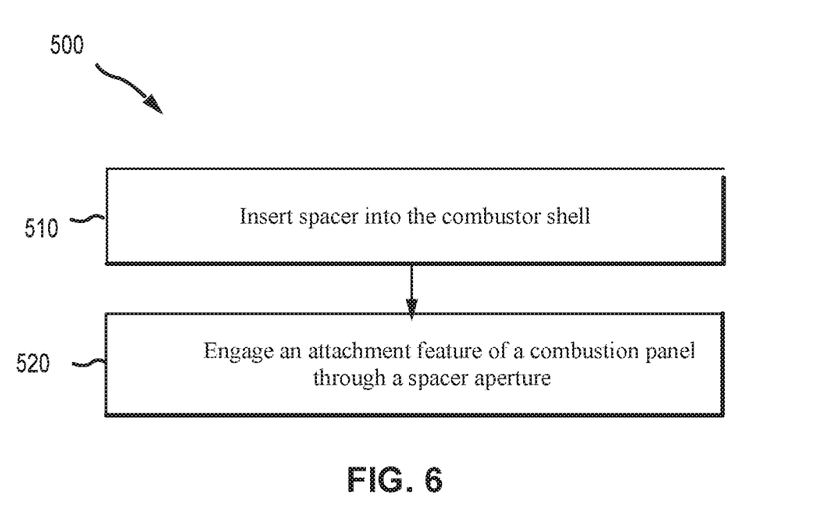
FIG. 6 illustrates a flow diagram of a process for manufacturing a combustor shell in accordance with various embodiments.
Figure 7:
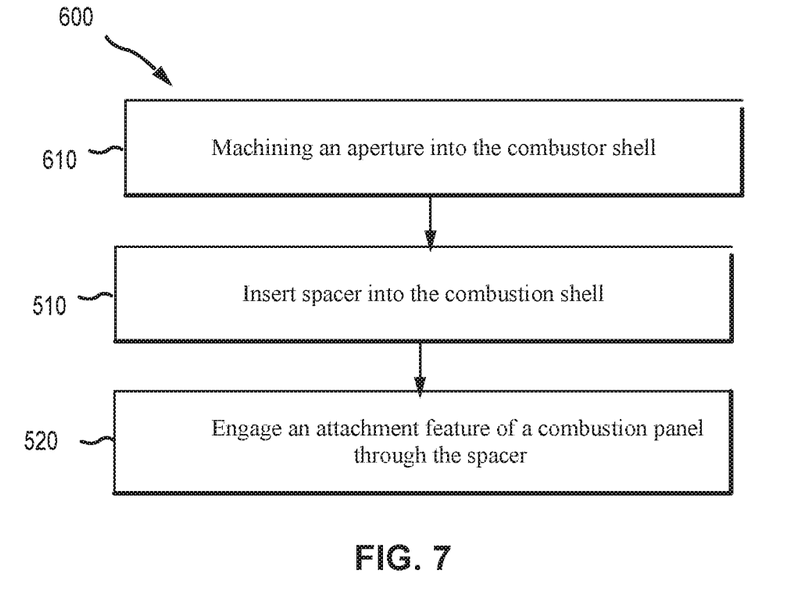
FIG. 7 illustrates a flow diagram of a process for manufacturing a combustor shell in accordance with various embodiments.
Figure 8:
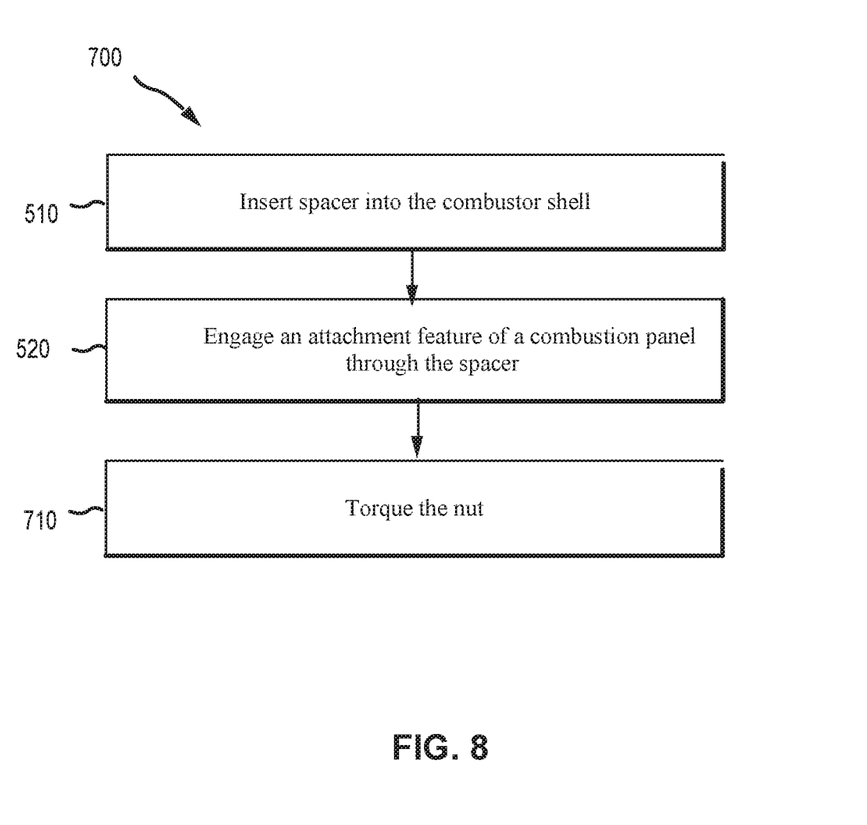
FIG. 8 illustrates a flow diagram of a process for manufacturing a combustor shell in accordance with various embodiments.

In various embodiments, and with reference to FIG. 6, a method 500 of mounting a combustor panel to a combustor shell is illustrated. A spacer may be inserting into a combustor shell (step 510). The spacer may comprise a spacer aperture at least partially defined by an inner wall of the spacer. An attachment feature of a combustion panel may be engaged through the spacer aperture (step 520). A nut may be engaged on the attachment feature (step 530). Referring to FIG. 7, a method 600 of mounting a combustor panel to a combustor shell may further include machining a first aperture into the combustor shell (step 610). Referring to FIG. 8, a method 700 of mounting a combustor panel to a combustor shell may further include torquing the nut (step 710).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor shell comprising:
   a first aperture at least partially defined by an inner wall of the combustor shell and passing from a diffuser-facing side of the combustor shell to a combustor-facing side of the combustor shell; and
   a spacer comprising a first segment coupled to a first flange, wherein the first flange is disposed on the diffuser-facing side of the combustor shell, wherein an outer wall of the spacer is coupled with at least a portion of the inner wall of the combustor shell, wherein the spacer comprises threads on a spacer inner wall of the spacer.

2. The combustor shell of claim 1, wherein the first aperture of the combustor shell is an oblong shape.

3. The combustor shell of claim 1, wherein the spacer is configured to engage an attachment feature of a combustor panel.

4. The combustor shell of claim 3, wherein a contact length between the spacer and the attachment feature is greater than a distance between the diffuser-facing side of the combustor shell and the combustor-facing side of the combustor shell.

5. The combustor shell of claim 1, wherein the spacer further comprises a second flange coupled with the first segment and disposed on the combustor-facing side of the combustor shell.

6. The combustor shell of claim 1, wherein the spacer further comprises a spacer aperture at least partially defined by the spacer inner wall of the spacer.

7. A gas turbine engine comprising,
   a combustor, the combustor comprising the combustor shell in accordance with claim 1.

8. A method of mounting a combustor panel to a combustor shell, comprising:
   inserting a spacer into the combustor shell, the spacer comprising a spacer aperture at least partially defined by an inner wall of the spacer, wherein the spacer comprises threads on the inner wall of the spacer;
   engaging an attachment feature of the combustor panel through the spacer aperture; and
   engaging a nut on the attachment feature.

9. The method of claim 8, further comprising machining a first aperture into the combustor shell.

10. The method of claim 8, further comprising torquing the nut.

11. A combustor shell comprising:
    a first aperture at least partially defined by an inner wall of the combustor shell and passing from a diffuser-facing side of the combustor shell to a combustor-facing side of the combustor shell; and
    a spacer comprising a first segment coupled to a first flange, wherein the first flange is disposed on the diffuser-facing side of the combustor shell, wherein an outer wall of the spacer is coupled with at least a portion of the inner wall of the combustor shell, wherein the spacer further comprises a second flange coupled with the first segment and disposed on the combustor-facing side of the combustor shell.

12. A gas turbine engine comprising, a combustor, the combustor comprising the combustor shell in accordance with claim 11.

* * * * *